UNITED STATES PATENT OFFICE.

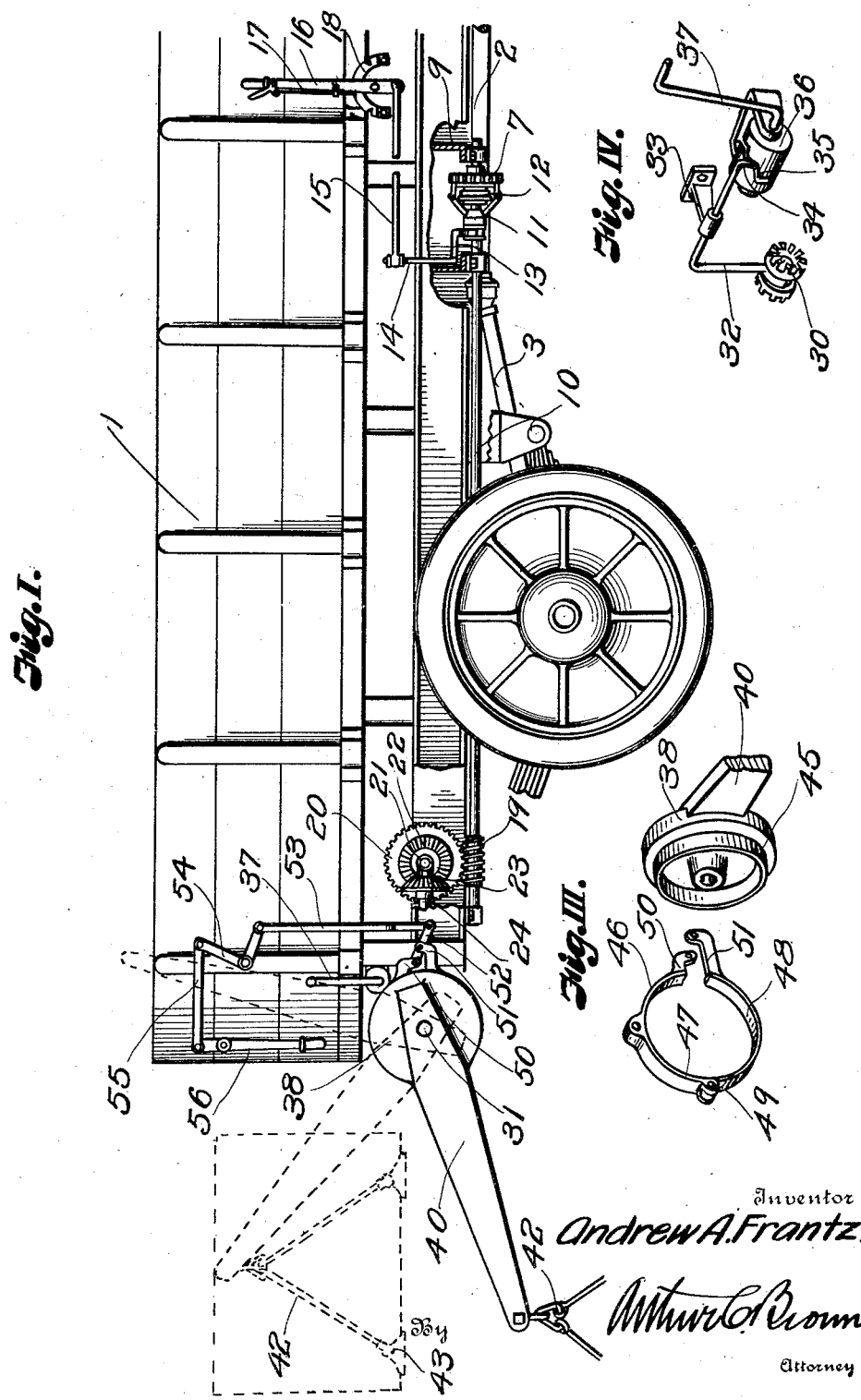

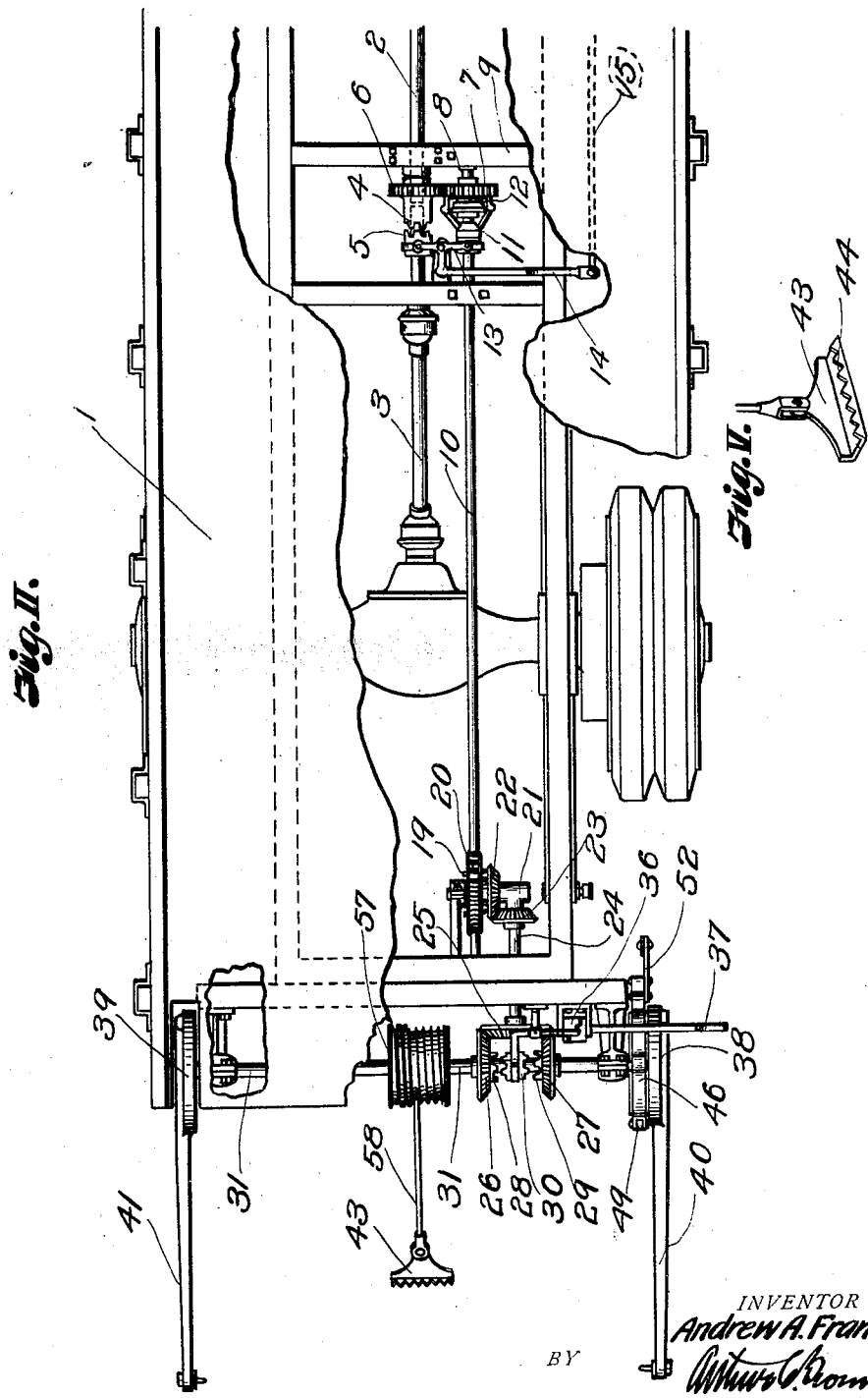

ANDREW A. FRANTZ, OF TOPEKA, KANSAS.

LOADING AND UNLOADING MECHANISM.

1,408,576.  Specification of Letters Patent.  Patented Mar. 7, 1922.

Application filed February 17, 1919. Serial No. 277,503.

*To all whom it may concern:*

Be it known that I, ANDREW A. FRANTZ, a citizen of the United States, residing at Topeka, in the county of Shawnee and State of Kansas, have invented certain new and useful Improvements in Loading and Unloading Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a power loading device for trucks and other vehicles and one of the objects thereof is to provide means whereby the driving element of the vehicle may be disconnected from its differential or other transmission and be temporarily utilized as the power medium for the loading device. Another object of the invention is to provide means whereby heavy objects may be quickly loaded onto and unloaded from the truck without danger of accident.

The invention also contemplates the provision of means for braking the loading mechanism so that the speed at which the device is unloaded may be under the control of the operator.

Other objects and advantages of this invention will be referred to hereinafter, it being understood that changes in form, proportion and minor details of construction may be resorted to without departing from the spirit of the invention or sacrificing any of its advantages.

In the drawings,

Fig. I is a side elevational view of a truck equipped with my invention.

Fig. II is a fragmentary top plan view of the same.

Fig. III is a disassociated perspective view of a braking element.

Fig. IV is a detail perspective view of a reversible clutch for the winding drum shaft, and Fig. V is a detail perspective view of one of the load engaging jaws.

Referring now to the drawings by numerals of reference:

1 designates a motor vehicle of approved construction provided with a drive shaft 2 connected to the usual motor in the usual manner. The drive shaft 2 is shown as being in line with but separated from the differential transmission shaft 3. These shafts 2 and 3, however, may be connected by bringing the clutch members 4 and 5 together, it being understood that the clutch member 4 is fast on the shaft 2 and that the clutch member 5 is longitudinally movable on the shaft 3. The clutch member 4 carries a spool gear 6 adapted to mesh with a spool gear 7 on shaft 8 carried by the cross bar 9 on the frame of the vehicle 1.

Aligning with the shaft 8 is a countershaft 10 provided with a clutch member 11 adapted to be brought into clutching engagement with a clutch member 12 on the shaft 8 whereby when the two clutching members 11 and 12 are brought together, motion will be communicated from shaft 2 through gears 6 and 7 to the shaft 10. The clutch members 5 and 11 are adapted to alternately be brought into clutching engagement with their complementary members through the clutch actuator 13 provided with an outstanding arm 14 connected to the link 15 on the segmental actuating lever 16, which is provided with a pawl 17 to engage the segmental rack 18, as best shown in Figure I. Therefore, when the lever 16 is moved in one direction, the clutch members 4 and 5 will be brought into engagement so that the motor vehicle may be driven in the usual way and the movement necessary to bring the clutch members 4 and 5 into engagement will be effective in moving the clutch members 11 and 12 out of engagement and vice versa.

On the shaft 10 is a worm 19 which meshes with a complementary gear 20 on the bracket 21 carried by the vehicle frame and rotatable with the gear 20 is a beveled gear 22 which meshes with a beveled gear 23 on the shaft 24, said shaft 24 carrying a beveled gear 25 meshing with the oppositely driven beveled gears 26 and 27, each of which has a clutch face as, for example, 28 and 29, to alternately receive a complementary clutch member 30 keyed on shaft 31, it being understood that the gears 26 and 27 are loose on the shaft 31 so that when the clutch member 30 is moved in one direction, the shaft 31 will be rotated in a given direction, and when the clutch face is moved in the opposite direction, a reverse movement of shaft 31 will take place and the winding drum operated. The construction of the clutch member 30 and its complementary mechanism is best shown in Figure IV as consisting of a spool-like member having a shifter 32 guided in bracket 33 and engaging the member 30. One end of the shifter 32 is provided with a depending finger 34 engaging a zigzag groove 35 in a rotating cylinder 36 which may be rotated by a crank 37. When the crank 37 is moved through a part of a revolution, the zigzag groove 35 will shift the clutch member 30, a further movement will throw the clutch member in neutral position and a still further movement will move the clutch member in an opposite direction, as will be clearly apparent by reference to Figure IV. Therefore, the direction of travel of the shaft 31 may be controlled through the mechanism shown in Figure IV.

Fixed on the respective ends of the shaft are heads 38 and 39 which carry outstanding arms or levers 40 and 41 terminally supporting slings or flexible connections 42 which are provided with jaws or lifts 43, best shown in Figure V as consisting of brackets provided with edge teeth 44 to engage the load. The heads are also provided with bracket drums or flanges 45 adapted to be engaged by split brake bands 46 consisting of complementary members 47 and 48 hinged at 49 and having arms 50 and 51 connected by links 52, each fastened at one end to an arm 50 and fulcrumed to an arm 51 so that when the links or levers 52 are rocked by a rod 53, the brake band members may be brought together or moved apart to engage or disengage the brake band 45. The rods 53 may be actuated by the elbow levers 54, the link 55 and the hand lever 56. Therefore, it will be seen through the medium of the hand lever 56, the rotative action of the shaft 31 may be under the control of the operator.

On the shaft 31 is rigidly mounted a winding drum 57 around which is wound a cable 58 having at its end a lift or jaw 43, the drum 57 and cable being adapted to be brought into driving connection with shaft 31 by shifting clutch member 30 from right to left.

When the parts are assembled and it is desired to load a heavy article, such as a box or the like, the device to be loaded onto the truck will be engaged by the lifts or jaws, as shown in the dotted lines in Figure I, and the lever 16 will be operated to throw out the driving connection between shafts 2 and 3 and throw into driving connection the shaft 10. As the shaft 2 is rotated by its motor, motion will be communicated through the shaft 10, worm 19, gears 20 and 22 to shaft 24, through gear 23 and through gear 25 to gears 26 or 27 loose on shaft 31. The clutch member 30 will be operated to engage one of the clutch faces on one of the gears 26 or 27 dependent upon the designed direction of travel of the shaft 31 whereby said shaft 31 will be power driven. When it is desired to retard the rotation of shaft 31 as, for example, in loading and unloading, the brake mechanism may be operated. If the brake is applied while the device is unloading, which will usually be the case, any liability of the load receiving a jolt on account of being suddenly deposited on the ground will be avoided. After the loading or unloading is accomplished, the clutch 5 may be shifted into engagement with the clutch 4, simultaneously throwing out clutch 11 so that the truck may be operated in the usual way.

When it is desired to use the drum 57, the flexible connection 58 and the device 43 for drawing boxes and the like up skids onto the vehicle, the arms 40 and 41 are removed and the shaft 31 is rotated to wind the flexible connection or cable 58 upon the drum.

What I claim and desire to secure by Letters-Patent is:

1. A loading and unloading device, comprising a shaft, a disk-shaped head carried by said shaft, an outstanding arm carried by said head, a brake drum, carried by said head, a brake band loosely mounted on said drum, and lever mechanism for operating said brake band.

2. In a loading and unloading device, a shaft, heads carried by said shaft, outstanding arms carried by said heads, article-engaging means carried by the free ends of said arms, a brake drum on one of the heads, a brake band loosely mounted on said drum, and means for actuating said brake band.

3. In a loading and unloading device, a shaft, heads on the ends of said shaft, outstanding arms carried by said heads, article engaging means carried by said arms and a brake engageable with a head for retarding the rotative movement of said shaft.

4. In a device of the class described, a rock shaft, arms carried by the rock shaft, a head rigidly carried by one of the arms and having an annular brake - engaging drum, a brake band normally loosely mounted about the brake drum, and a lever-actuated mechanism for binding the brake band onto the drum.

5. In a device of the class described, a truck, a rock shaft at the rear of the truck, arms carried by the rock shaft, one of said arms having a brake drum rigid therewith, a brake band mounted at the rear of the truck, and a lever mechanism accessible from the rear of the truck for operating the brake band.

In testimony whereof I affix my signature.

ANDREW A. FRANTZ.